United States Patent [19]

Waldman

[11] Patent Number: 4,917,740

[45] Date of Patent: Apr. 17, 1990

[54] BRAIDING MACHINE

[75] Inventor: Myron Waldman, Pawtucket, R.I.

[73] Assignee: WST Power Electronics, Inc., Providence, R.I.

[21] Appl. No.: 166,569

[22] Filed: Mar. 11, 1988

[51] Int. Cl.[4] .................... B29C 53/84

[52] U.S. Cl. .................... 156/51; 156/244.12; 156/244.17; 156/273.9; 156/379.6; 156/379.7; 264/25; 264/103; 264/174; 425/113; 425/174.8 R

[58] Field of Search .................... 156/51, 273.9, 379.6, 156/379.7, 244.17, 244.12; 264/25, 26, DIG. 45, DIG. 46, 174, 173, 103, 104, 27; 425/174.8 R, 174.8 E, 113, 114, 174.6, 174

[56] References Cited

U.S. PATENT DOCUMENTS

| | | | |
|---|---|---|---|
| 2,248,840 | 7/1941 | Wilkoff | 264/DIG. 46 |
| 2,741,296 | 4/1956 | Collins | 156/379.6 |
| 2,810,424 | 10/1957 | Swartswelter et al. | 264/174 |
| 2,810,669 | 10/1957 | Heupgen | 156/51 |
| 3,144,369 | 8/1964 | Foord et al. | 264/174 |
| 3,238,280 | 3/1966 | Gray et al. | 264/103 |
| 3,332,138 | 7/1967 | Garner | 264/173 |
| 3,364,289 | 1/1968 | Campbell | 264/103 |
| 3,503,823 | 3/1970 | Richart et al. | 264/25 |
| 3,784,732 | 1/1974 | Whitfill, Jr. | 264/103 |
| 4,130,450 | 12/1978 | Bahder et al. | 264/174 |

FOREIGN PATENT DOCUMENTS

| | | | |
|---|---|---|---|
| 687326 | 5/1964 | Canada | 264/174 |
| 51-31271 | 9/1976 | Japan | 264/25 |

*Primary Examiner*—Jeffery Thurlow
*Attorney, Agent, or Firm*—Irving M. Kriegsman

[57] ABSTRACT

A braiding machine for use in applying a tubular shaped braid around a product includes a closed loop induction heater for applying heat to the product as it is being fed through the braiding machine before it is wound on a take-up reel for use or further processes. The induction heater includes an inductor and a pair of pulley wheels and is attached to the frame of the braiding machine by a pair of brackets. The heater can be by-passed if the product does not require heat. The braiding machine is especially useful in applying a tubular metal braid over an insulated wire core which is itself covered by a served metal coated mylar strip having a heat sensitive adhesive on one surface which must be activated before the product is complete.

9 Claims, 2 Drawing Sheets

BRAIDING MACHINE

BACKGROUND OF THE INVENTION

The present invention relates generally to braiding machines and more particularly to a braiding machine which is constructed so as to include a closed loop induction heater for use in applications such as the braiding of a metal filament over an insulated core wire which is itself covered by a metal coated strip MYLAR insulating material having a heat sensitive adhesive on one surface. The heater is used in this particular application to activate the heat sensitive adhesive.

Braiding machines are well known in the art and have been used in making braids of various materials for over seventy-five years for a variety of different applications. Generally, these machines include a supply spool for holding a roll of a product such as electrical wire or string over which a braid is to be applied, a braiding mechanism for applying a braid around the product, a take-up spool for holding the product after the braid has been applied, a capstan for feeding the product from the supply spool into the braiding mechanism and then from the braiding mechanism to the take-up spool and a motor or other mechanism for driving the capstan, the braiding mechanism and take-up spool. These machines may also include an auxiliary spool for holding a roll of strip material which is fed into the braiding mechanism along with the product from the supply spool and a serving tool for serving the strip material into the braiding mechanism from the auxilary spool. The braiding mechanism usually includes upper and lower tiers of supply spools containing rolls of braiding material. These supply spools are arranged to revolve in opposite directions about a common axis with the braiding material from the lower supply spools passing over and under the braiding material from the upper supply spools and then converging and intermeshing in a tubular shaped braid around the product. The product moves through the braiding machine at a speed of about 15 feet per minute. An example of a typical braiding machine may be found in U.S. Pat. No. 1,064,407 which issued on Aug. 3, 1910 in the name of S.W. Wardwell.

Braiding machines are used extensively in the electrical wire and cable fabrication industry for applying braids of fabric or metal filament over various types of electrical conductors.

One particular application in which braiding machines are used and to which this invention is primarily but not exclusively directed is in the fabrication of a jacketed coaxial cable in which a braid of metal filament is formed over an insulated wire core which is itself covered by a served metal coated strip of mylar which has a heat activated adhesive on one side. In making this type of product, the strip of MYLAR insulating material is introduced into the braiding machine from the auxiliary spool and is placed in proper position next to the insulated wire core by means of the serving tool which is located in the braiding machine underneath the braiding mechanism. After the braid is applied, the strip of MYLAR insulating surrounds the insulated wire, overlapping on itself in a linear manner, and the braid surrounds the strip of MYLAR insulating. The product which is essentially a coaxial cable but without an external jacket is then wound on the take-up spool. Next, the product is removed from the braiding machine and brought over to an extrusion machine where a jacket, typically of plastic or rubber, is applied. The product is fed into the extrusion machine at speeds ranging from about 200 and 2000 feet per minute. As the braided product is being fed from the take-up spool into the extrusion machine it is heated by heat from a heat source. The heat source which is located in front of the extrusion machine is either a flame or an induction heater. The heat applied to the product is used to trigger the adhesive on the mylar strip and as a result seal the strip of MYLAR insulating about itself in a continuous sheave over the insulated wire core and under the braid. The product leaving the extrusion machine is a jacketed coaxial cable. In some applications, a second mylar coated metal strip and a second metal filament braid are applied to the product before the jacket is extruded. The second strip of MYLAR insulating usually does not have an adhesive layer. As can be appreciated, in both constructions (i.e. a single mylar/braid combination or a pair of mylar/braid combinations the heat from the heat source must travel through several layers of material (the number and types of layers depending on the particular construction of the product) before it actually reaches the adhesive.

It has been found that heating the product in this manner in order, to activate the heat sensitive adhesive is not entirely satisfactory. In particular, in some instances, especially when there are double layers of mylar and braid material, by the time the heat actually reaches the adhesive layer the product is well past the heat source. As a result the adhesive is very often not uniformly and/or not completely activated. Consequently, the strip of MYLAR insulating is not completely and continuously sealed about itself to form a sheave shaped configuration. When during use, the product is subsequently bent or twisted the unsealed areas become small openings which may result in energy losses within the cable. In other instances although the heat applied is sufficient to activate the entire adhesive it is so intense that one or more filaments in the braid are actually burned and break off. This creates a defective braid which cannot be used.

Another technique that has been employed in the past to activate the heat sensitive adhesive in this type of cable construction has been to heat the product with heat generated by a radiant heater as the product is being passed through the braiding machine. One problem with this arrangement is that the heat output from a radiant heater cannot be closely and quickly controlled. Consequently, during start up of the braiding machine and heater the heat applied is very often inadequate and during turn off of the heater and braiding machine the product is very often burned. This is especially important since braiding machines are very often turned on and off several times during a run to refill the braiding wire on the braiding wire spools. Another disadvantage of this arrangement is that the size of the radiant heater needed to accomplish the job in a satisfactory manner is relatively large. Consequently, because of space limitations, the heater is located next to and above the braiding machine. This, in turn, makes feeding the wire past the heater rather cumbersome and difficult. Also, radiant heaters are not very safe to use.

Accordingly, it is an object of this invention to provide a new and improved braiding machine.

It is another object of this invention to provide a braiding machine for applying a metal braid over an insulated wore core which is itself surrounded by a metallic coated strip of MYLAR insulating having a heat activated adhesive on one side.

It is still another object of this invention to provide a braiding machine which includes a heat source which can be easily and closely controlled controlled.

The above and other object are achieved according to this invention by providing a braiding machine which includes a heat source in the form of a closed loop type of an induction heater. The induction heater is mounted directly on the braiding machine, is located so that the product can be easily fed through it and is used so as to apply heat to the product after the braid has been applied and as it is being fed to the take-up spool. Since the product passing through the braiding machine is moving at a relatively slow rate and the heat source is an induction heater, the application of heat to the product can be very easily and very closely controlled. As will become readily apparent, the induction heater is limited to use with metallic type of braids.

SUMMARY OF THE INVENTION

A braiding machine constructed according to the teachings of the present invention includes a supply spool for holding a quantity of a product over which a braid is to be applied, a capstan for unwinding the product from the supply spool, a braiding mechanism for applying a braid to the product as it is being passed from the supply spool to the capstan, a take-up spool for taking the braided product from the capstan and winding it thereon in proper condition to be freely unwound for subsequent use or delivery to other processes and a closed loop induction heater for applying heat to the braided product as it is being passed from the capstan to the take-up spool.

Various features and advantages will appear from the description to follow. In the description, reference is made to the accompanying drawings which forms a part thereof and in which is shown by way of illustration a specific embodiment for practicing the invention. This embodiment will be described in sufficient detail to enable those skilled in the art to practice the invention, and it is to be understood that other embodiment may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
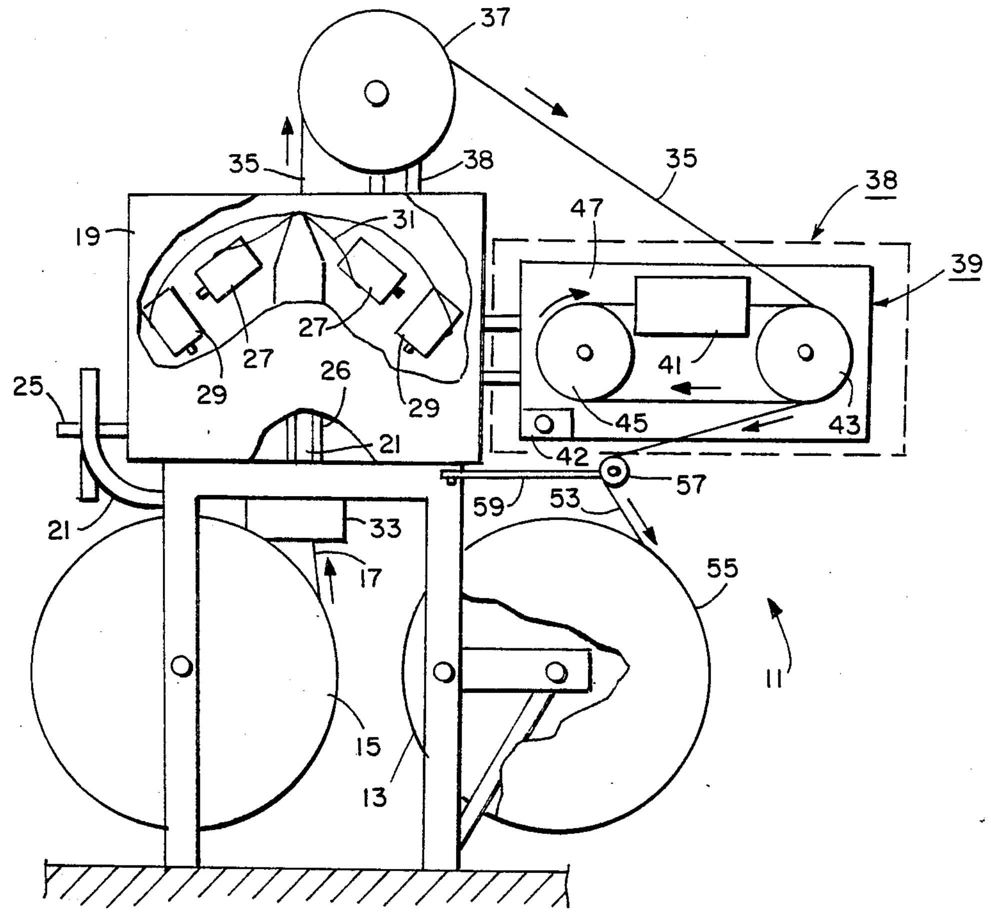
FIG. 1 is a simplified front elevation view partly in section of a braiding machine constructed according to the teachings of the present invention.

Referring now to the drawings, there is shown in FIG. 1 a braiding machine constructed according to the teachings of the present invention, the braiding machine being identified generally by reference numeral 11. For simplicity, parts of braiding machine 11 which are not pertinent to the invention are not shown.

Braiding machine 11 is arranged and will hereinafter be described by way of example with reference to applying a metal filament type of braid over an insulated wire core which is itself covered by a served metal coated strip of MYLAR having a heat sensitive adhesive on one side; however, it is to be understood that braiding machine 11 is not exclusively limited to making this particular type of wire construction.

As can be seen, braiding machine 11 includes a frame 13.

A supply spool 15 for holding a roll of core construction 17 over which a braid is to be applied is rotatably and removably mounted on frame 13. Core construction 17 comprises, in this instance, a roll of copper wire 18 covered with a plastic 18-1, such as polyethylene, which serves as an insulator. Core construction 17 is fed from supply spool 15 into a braiding mechanism 19 which is mounted on frame 13 above supply spool 15. At the same time, a metal coated strip 21 of mylar having a heat sensitive adhesive on one surface is introduced into braiding mechanism 19. Strip 21 is wound in a roll configuration on an auxilary spool 25 which is rotatably and removably mounted on one side of frame 13. Strip 21 is fed into braiding mechanism 19 from the bottom and is positioned alongside of core 17 by means of a serving tool 26.

Braiding mechanism 19 forms a tubular shaped braid over core construction 17 and strip of MYLAR insulating material 21. Braiding mechanism 19 comprises a set of upper braiding material supply spools 27 and a set of lower braiding material supply spools 29. Each one of the spools 27 and 29 contains a roll of braiding material 31 which in this instance is thin metal wire. The two tiers of spools 27 and 29 are arranged to revolve in opposite directions about a common vertical axis with the material from the lower supply spools 29 passing over and under the material from the upper supply spools 27 and then converging and intermeshing in a tubular shaped braid 30 over core construction 17 and strip of MYLAR insulating material 21. Braiding mechanism 19 is driven by a motor 33 which is coupled to braiding mechanism 19 by any suitable mechanical means, such as gears and/or belts, not shown.

When the product leaves braiding mechanism 19 it is essentially an insulated wire core surrounded by a metal coated strips of MYLAR insulating which in turn is covered by a metal braid. The strips of MYLAR insulating is in a generally tubular configuration and the adhesive layer on the strips of MYLAR insulating has not yet been activated. In the drawing, the product leaving braiding mechanism 19 is identified by reference numeral 35.

A capstan 37 which is rotatably mounted on a post 38 which is fixedly attached to frame 13 pulls the product 35 through braiding mechanism 19. The product 35 is preferably wound one or more turns around the periphery of capstan 37 to insure a binding contact. Capstan 37 is driven at a constant speed by motor 33 which is connected to capstan 37 by any suitable mechanical means, not shown.

After product 35 is passed around capstan 37 it is fed through a heater station 38. Heater station 38 includes a closed loop induction heater 39 which supplies sufficient heat to product 35 to trigger the heat sensitive adhesive on metal coated strip of MYLAR insulating 21, thus sealing metal coated strip of MYLAR insulating 21 to itself in an overlapping configuration so as to form a continuous sheave around insulated wire core 17 but under braid 30. Product 35 moves within braiding machine 11 at a rate of around 15 feet per minute where it is heated in a manner as will hereinafter be described.

Figure 2:
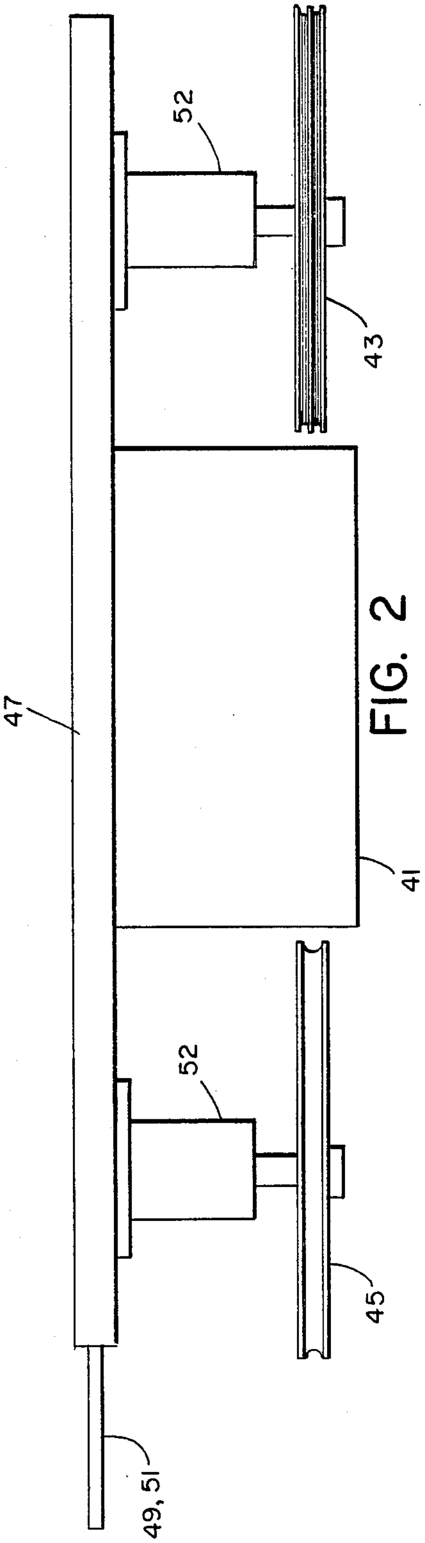
FIG. 2 is a top view of the heater in the braiding machine shown in FIG. 1.

Heater 39, which is also shown in FIG. 2, includes an inductor 41. Inductor 41 includes a core of suitable material, the core having a tubular passageway through which the wire product to be heated is passed. The core (not shown) carries primary windings (not shown) which are connected through a control box 42 to a source of alternating current (not shown). A pair of pulley wheels 43 and 45 are arranged on opposite ends of inductor 41. Wheel 43 is made of a conductive material, such as bronze. Inductor 41 and control box 42 are fixedly mounted on a supporting plate 47 which is fixedly attached to post 37 by a pair of rigid brackets 49 and 51. Pulley wheels 43 and 45 are rotatably mounted on plate 47. The mounting arrangement for pulley wheels 43 and 45 includes bearings 52 to permit easy turning movement. Pulley wheel 43 has a pair of peripheral grooves while pulley wheel 45 has a single groove. As shown by the arrows, product 35 enters one of the grooves in wheel 43 from capstan 37, passes around wheel 43 and then passes around wheel 45, then passes through inductor 41, then around wheel 43 again and then exits heater station 38. As can be appreciated, product 35 (with its outer metal braid 30) forms a closed electrical loop as it is passed over wheels 43 and 45. When product 35 is passed through inductor 41 a current is induced into it by inductor 41, product 35 acting as the secondary of the inductor. The closed loop path of travel of product 35, in effect, short circuits the induced current causing product 35 to heat up. Since wheel 43 is made of bronze it is not necessary for the loop to touch as they pass over wheel 43, the loop being formed through the wheel. An example of a a closed loop induction heater may be found in U.S. Pat. No. 3,117,209 which issued on Jan. 7, 1964 to W.L. Peltier. Since product 35 passes through heater 39 at a relatively slow speed (i.e. 15 feet per minute) and since the heat applied to the product is related to the speed at which the wire moves and the induced current, the heat applied can be very closely controlled.

Figure 3:
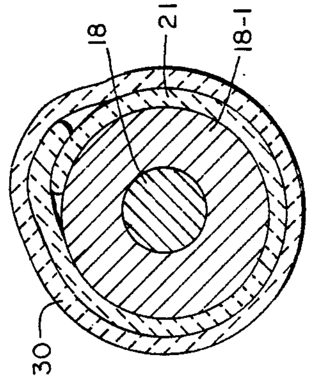
FIG. 3 is a cross-section view of the product in the take-up spool in the braiding machine of FIG. 1.

The product leaving heater 39, which is identified by reference numeral 53, is fed into and wound around a take-up spool 55 which is rotatably mounted on frame 13. Take-up spool 55 is driven by motor 33 which is connected to take-up spool 55 by mechanical means (not shown) which are arranged to turn take-up spool 55 at a constant torque. A guiding pulley 57 mounted on an arm 59 which is pivotally attached to frame 13 is interposed between heater 39 and take-up spool 55 to insure that product 53 will be wound properly on take-up 55. A cross-section view of product 55 as it appears on take-up spool 55 is shown in FIG. 3

As can be appreciated, product 53 as wound on spool 55 is a coaxial cable without an external jacket. If a jacket is desired, take-up spool 55 is removed from braiding machine 11 and brought over to an extrusion machine where the jacket may be formed. If the particular product to be fabricated is one which includes an additional braid and mylar strip combination then product 53 is run through machine 11 a second time.

If the product over which a braid is being applied is one in which the application of heat serves no useful purpose, then heater station 38 is by-passed and the product fed directly from capstan 37 to take-up spool 55.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. In a braiding machine wherein a product over which a metal braid is to be applied is drawn up from a supply spool, passed through a braiding mechanism and then wound onto a take-up spool, the improvement comprising a closed loop type induction heater disposed along the path of travel of the product from the braiding mechanism to the take-up spool for applying heat, when desired, to the product before it is wound on the take-up reel.

2. The braiding machine of claim 1 and wherein the product is fed from the braiding mechanism to the take-up spool through a capstan and wherein the heater is disposed along the path of travel of the product between the capstan and the take-up spool.

3. The braiding machine of claim 2 and wherein the heater includes an inductor having a passageway through which the product passes and a pair of rotatably mounted pulley wheels.

4. In a braiding machine of the type arranged to form a metal braid over an insulated wire cover covered with a served metal coated mylar strip having a heat sensitive adhesive on one surface and then wind the product onto a take-up reel, the improvement comprising closed loop induction heater means for activiating the heat sensitive adhesive before said product is wound on said take-up reel.

5. A method of constructing an electrical cable having a core of insulated wire, a sleeve being in the form of a metal coated strip of insulating material surrounding said core in overlapping relationship and having a heat sensitive adhesive for sealing purposes on one side, the method comprising:

a. providing a length of insulated wire.

b. providing a metal coated strip of insulating material having a heat sensitive adhesive on one side thereof.

c. positioning said metal coated strip of material around said insulated wire in overlapping relationship, d. applying a metal braid around said metal coated strip of material, then e. applying heat thereto by induction so as to activate the heat sensitive adhesive on the metal coated strip of insulating material such that the metal coated strip of insulating material forms a continuous sealed sleeve around the wire, and then f. winding the product around a take-up spool for subsequent use or delivery to other processes.

6. The method of claim 5 further including extruding a jacket over the product.

7. The braiding machine of claim 3 and wherein the pulley wheels are made of conductive material.

8. A method of constructing an electrical cable having a core of insulated wire, a sleeve over said core and a metal braid over said sleeve, said sleeve being in the form of a metal coated strip of insulating material surrounding said core in overlapping relationship and having a heat sensitive adhesive for sealing purposes on one side, the method comprising:

a. providing a supply spool having therein length of insulated wire, b. providing a supply of metal braid material, c. providing a metal coated strip of insulating material having a heat sensitive adhesive on one side thereof, d. using a braiding mechanism applying said metal coated strip of material around said insulated wire in overlapping relationship and a braid around said metal coated strip of material, then e. applying heat thereto by induction so as to activate the heat sensitive adhesive on the metal coated strip of insulating material such that the metal coated strip of insulating material forms a continuous sealed sleeve around the wire, and then f. winding the product around a take-up spool for subsequent use or delivery to other processes.

9. The method of claim 5 and further including extruding a jacket over the product.

* * * * *